United States Patent [11] 3,546,386

[72] Inventor Robert J. Darcey
Lanham, Maryland
[21] Appl. No. 783,375
[22] Filed Dec. 12, 1968
[45] Patented Dec. 8, 1970
[73] Assignee To the United States of America, as represented by the Administrator of the National Aeronautics and Space Administration

[54] SATELLITE COMMUNICATION SYSTEM AND METHOD
14 Claims, 4 Drawing Figs.

[52] U.S. Cl. ... 179/15; 325/4, 343/100
[51] Int. Cl. ... H04j 1/20
[50] Field of Search ... 179/15, 15(SSB), 15(MM), 15(APR); 325/4; 343/100(SAT)

[56] References Cited

UNITED STATES PATENTS

| | | | |
|---|---|---|---|
| 3,363,180 | 1/1968 | Geissler | 325/4 |
| 3,383,597 | 5/1968 | Battail | 343/100X |
| 3,487,169 | 12/1969 | Miyagi | 179/15 |

*Primary Examiner*—Ralph D. Blakeslee
*Attorneys*—R. F. Kempf, E. Levy and G. T. Mc Coy

ABSTRACT: A communication system and method including a synchronous satellite as a relay station includes large and small user transmission and reception sites. Large and small users are respectively defined as transmission and receiving sites having receiving antennas with apertures greater than 40 feet and less than 20 feet. From the large user sites a multiplicity of 3.1 KHz frequency multiplexed channels, at 4 KHz spacing, each having a suppressed subcarrier which is single sideband AM modulated, is single sideband modulated on a suppressed carrier transmitted to the satellite. A plurality of adjacent SSB channels at the large user site is omitted. From small and/or large user sites in the portion of the spectrum where the omitted channels would lie, signals are FM modulated on a subcarrier displaced from the suppressed carrier and transmitted to the satellite. At the satellite the AM and FM channels are converted to a spectrum including a pair of phase modulated side bands and a carrier. At small user receiver sites, one of the FM subcarriers relayed by the satellite in each sideband transmitted from the satellite is recovered and combined with the FM modulation thereon to derive the FM transmitted information signal.

Figure 1:
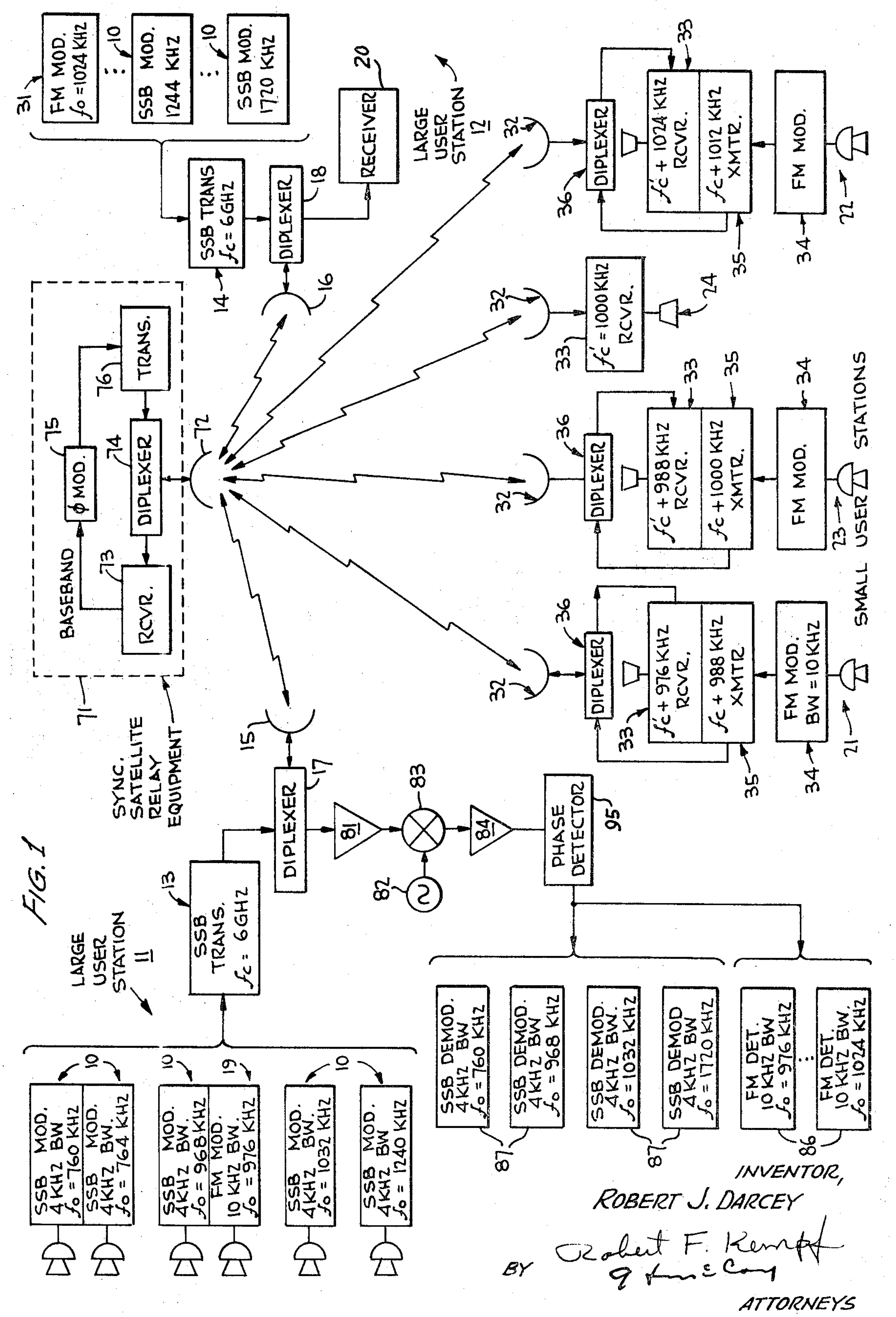

INVENTOR,
ROBERT J. DARCEY

BY Robert F. Kempf
[signature]

ATTORNEYS

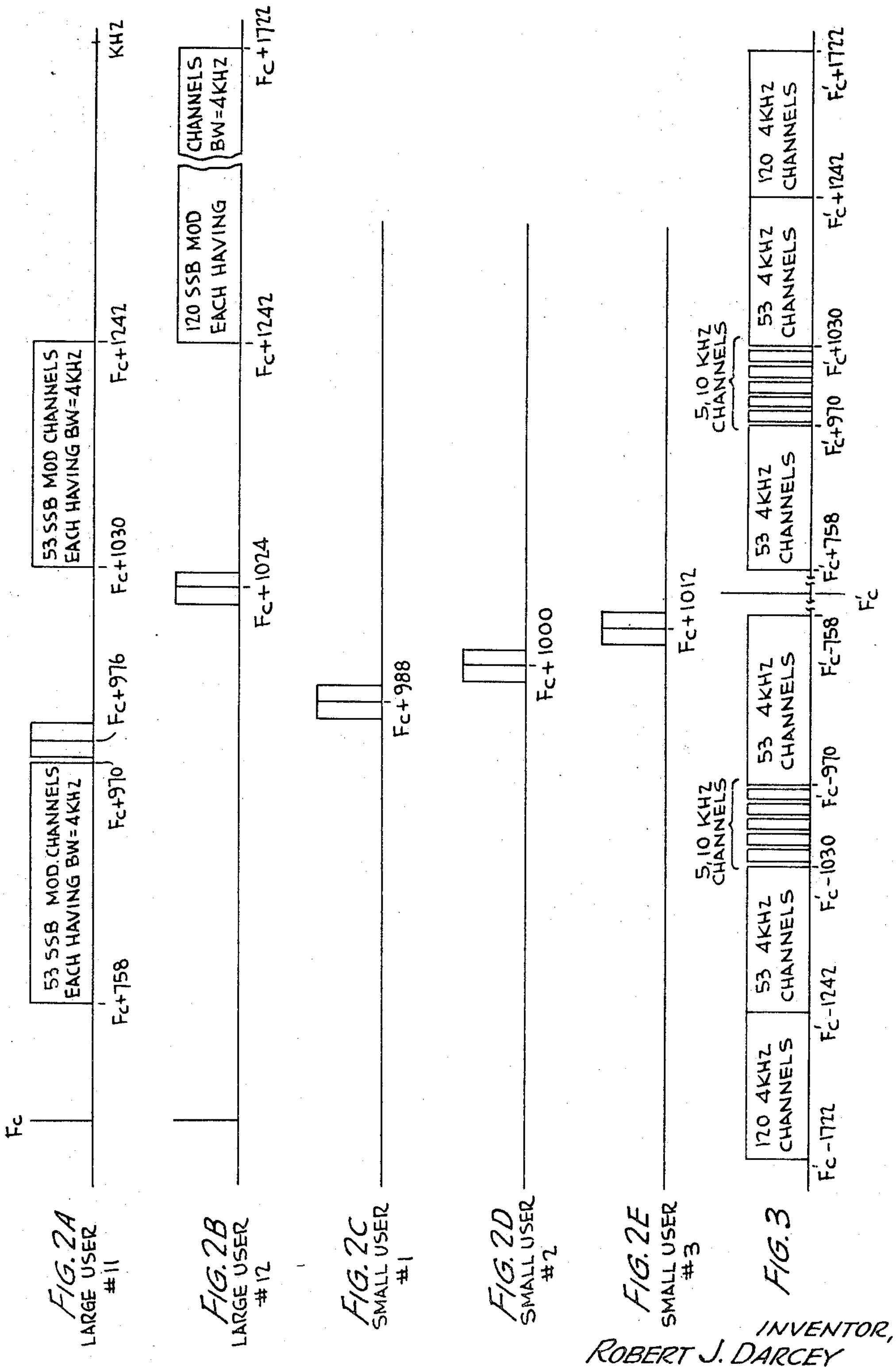
FIG. 2A LARGE USER #11, FIG. 2B LARGE USER #12, FIG. 2C SMALL USER #1, FIG. 2D SMALL USER #2, FIG. 2E SMALL USER #3, FIG. 3
INVENTOR,
ROBERT J. DARCEY
BY Robert F. Kempf
Attorney
ATTORNEYS INVENTOR,
ROBERT J. DARCEY
BY Robert F. Kempf
ATTORNEYS

SATELLITE COMMUNICATION SYSTEM AND METHOD

The invention described herein was made by an employee of the United States Government and may be manufactured and used by or for the Government for governmental purposes without the payment of any royalties thereon or therefor.

The present invention relates generally to communication systems and methods and, more particularly, to a communication system and method employing an earth satellite relay station, in combination with small user stations.

For the purposes of the present disclosure and claims, a large user is defined as one having an antenna reflector with a diameter of 40 feet or larger, while a small user has an antenna site with a dish aperture less than 20 feet.

One presently employed communication system utilizing synchronous earth satellites as relay stations includes several different ground stations capable of simultaneously deriving many frequency multiplexed single sideband AM channels having a bandwidth adequate for voice transmission. The frequency multiplexed channels are single sideband modulated on a suppressed carrier and transmitted to a satellite including relay equipment. The satellite relay equipment converts the multiplexed single sideband channels to a phase modulated spectrum comprised of a carrier and both sidebands and retransmits the spectrum on a different carrier from the carrier received thereby to the ground stations. The ground stations demodulate the phase modulated spectrum, and separate the different channels with standard single sideband frequency separating or demultiplexing equipment. This particular technique has been adapted because it enables the greatest amount of information to be transmitted with a particular bandwidth. For example, 1,000 voice 3.1 KHz channels can be transmitted with 0.9 KHz guard bands in a minimum bandwidth of 4 MHz.

In order properly to demodulate the phase modulated signals at the ground receiving station, it is necessary for each ground station to receive the composite spectrum at a sufficiently high level. In practice, for a typical single sideband voice channel having a total bandwidth of the order of 4 KHz, i.e., 3.1 KHz voice data and 0.9 KHz guard bands, the received phase modulated signal has sufficient strength to be detected only if the receiving site includes an antenna having a aperture of at least 40 feet in diameter and a receiver with low noise, front end characteristics. The 40 foot antenna aperture is of particular importance in systems wherein many channels on the order of 200 or more, are simultaneously frequency multiplexed. Although small user stations can transmit adequate power on a small number of channels to large user ground stations via a satellite, the small user stations are generally incapable of detecting a signal of sufficient strength to enable recovery of any of the frequency multiplexed channels with acceptable signal-to-noise ratios, regardless of whether the channel is transmitted from a large or small user site. Detection at the small user station at a signal-to-noise ratio comparable to that at a large user station is generally not possible because the small user sites include antennas with relatively small apertures and high noise temperature receivers. Hence, acceptable two-way communication with a small user site by means of prior art communication satellite relay stations is not generally possible.

In accordance with the present invention a minimum bandwidth system of the type described is modified so that small user reception of voice channels relayed from a communications relay satellite is achieved by reserving a number of adjacent channels normally transmitted from a large user site on a single sideband frequency multiplexed basis. The adjacent channels, instead of carrying single sideband AM voice information, include a subcarrier and first order angle modulated sidebands. The angle modulated sidebands occupy a bandwidth greater than the bandwidth of a single sideband channel, typically on the order of 10 KHz. The bandwidth of each angle modulated channel is a trade-off between the sensitivity of a receiver site and spectrum availability; as receiver sensitivity decreases channel bandwidth must be increased to accommodate greater modulation indices if small user stations having poor antenna and receiver characteristics are to be utilized. The use of angle modulation, in contrast to AM, for the channels received at the small user sites has the advantage of greater signal-to-noise ratio, even for narrow band (10 KHz) channels. In particular, for FM angle modulation, a signal-to-noise improvement by at least a factor of three over AM results, enabling acceptable small user reception of signals that could not be received with adequate intelligence levels if AM channel modulation were employed.

The AM channels omitted from the spectrum normally transmitted by the large user can either be in the center or at the far end (remote from the carrier) of the frequency multiplexed spectrum. The satellite relay station handles the FM channels in exactly the same manner as the single sideband AM channels, converting both into a phase modulated spectrum having a carrier and both sidebands.

At a small user ground station, the information in one FM channel can be detected with a receiver having a narrow bandwidth, on the order of 10 KHz, and a consequently low threshold signal level. The receiver is effectively tuned to the first order sideband modulated on the FM subcarrier transmitted from the relay station. The receiver, being of narrow bandwidth can easily be provided with a relatively low noise amplifier, further reducing the threshold signal level thereof. Detection of the FM signal, to the exclusion of the other narrow band SSB-PM signals, is possible because there is a predetermined frequency allocation which permits the use of a narrow band (10 KHz) FM receiver. To increase receiver signal strength by 3 db and reduce noise, the received spectrum from the satellite is effectively folded about the satellite carrier. To minimize antenna tracking problems, the small user sites of the present invention are preferably utilized in combination with a synchronous satellite.

It is, accordingly, an object of the present invention to provide a new and improved communication system and method utilizing synchronous earth satellites as relay stations.

Another object of the invention is to provide a new and improved system and method for transmitting voice bandwidth information to a small user receiver site via a link including a synchronous earth satellite.

Still another object of the invention is to provide a satellite communication system and method capable of transmitting between large user sites a multiplicity of single sideband voice channels in frequency multiplexed arrangement with FM voice channels which are selectively received at small user sites.

Figure 4:
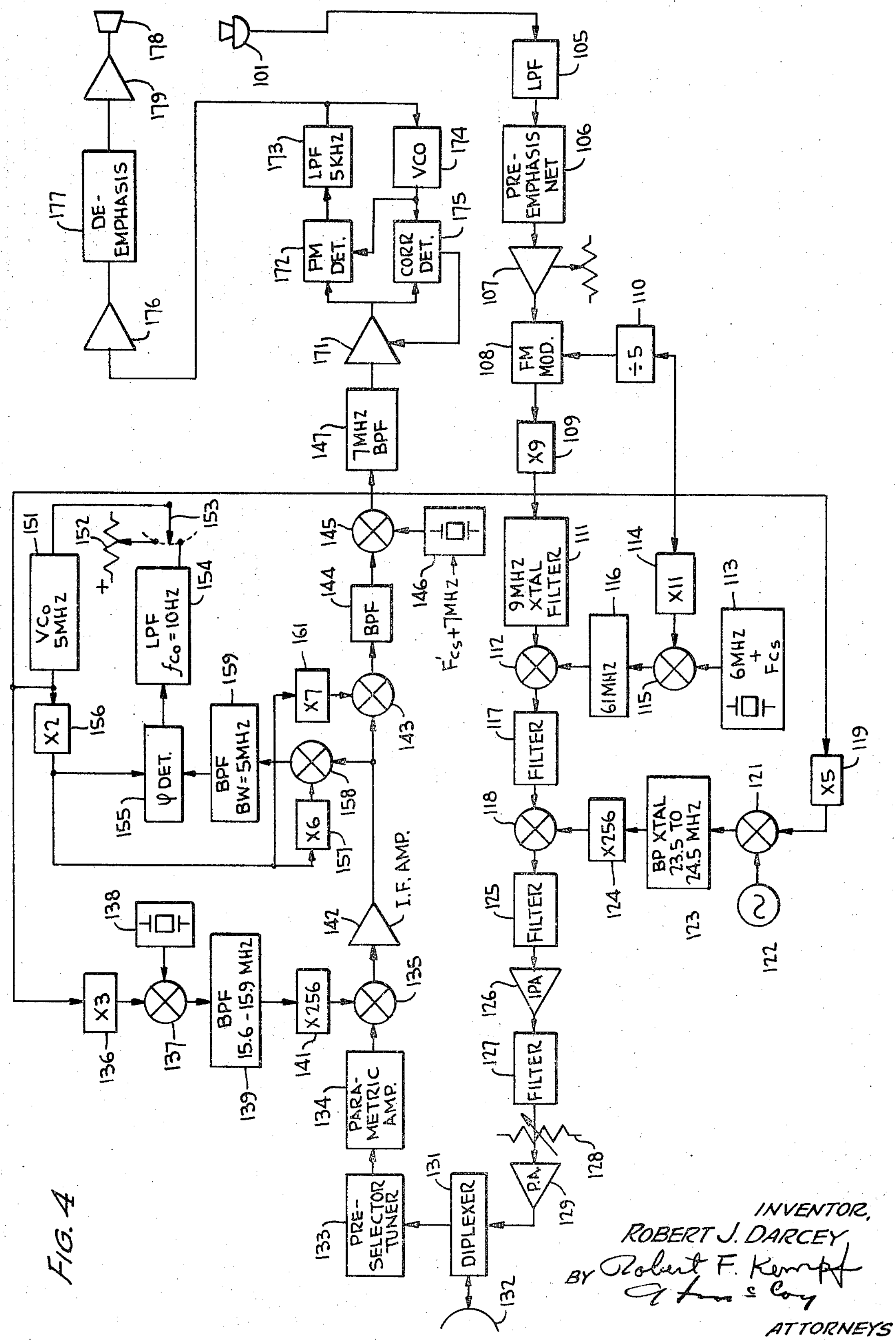

The above and still further objects, features and advantages of the present invention will become apparent upon consideration of the following detailed description of one specific embodiment thereof, especially when taken in conjunction with the accompanying drawings, wherein:

FIG. 1 is a block diagram illustrating the system and method concepts of the present invention;

FIGS. 2A—2E and 3 are spectrum diagrams useful in describing the operation of the system; and FIG. 4 is a block diagram of a typical small user equipment in the system illustrated by FIG. 1.

In the following detailed description, specific frequencies and bandwidths are set forth to facilitate the presentation. It is to be understood, however, that the system is susceptible to use with any appropriate frequency range and bandwidth, except as may be limited by the claims. The specific description is made in conjunction with a communication link including an ATS synchronous satellite which functions as a relay station responsive to single sideband data transmitted from a number of frequency multiplexed large user sites. It is to be understood, however, that the techniques described are applicable with other types of synchronous earth satellite communication systems.

Reference is now made specifically to FIGS. 1, 2 and 3 of the drawings wherein there are illustrated block and spectral diagrams in accordance with one embodiment of the invention. The system of FIG. 1 includes a pair of large user stations 11 and 12, each of which comprises a number of single sideband AM sources 10, each having a total 4 KHz bandwidth (3.1 KHz being allocated for information and 0.9 KHz for guard bands), adequate for voice transmission. At station 11, there are provided 106 such sources having center frequencies of 760 KHz, 764 KHz ... 968 KHz and 1,032 KHz ... 1,240 KHz. There are no single sideband AM, 4 KHz sources 10 at large user station 11 in the frequency range between 970 KHz and 1,030 KHz. The portion of the spectrum between 970 KHz and 1,030 KHz is reserved for a plurality of 10 KHz bandwidth FM modulated voice channels. To enable FM voice transmission from large user station 11 to any number of small user receivers, station 11 includes FM modulator 19 having a 10 KHz bandwidth and a center frequency of 976 KHz.

At large user station 12, there are provided 120 single sideband AM modulators 10, each having a total 4 KHz bandwidth. The center frequencies of the single sideband modulated sources 10 comprising the channels originating at station 12 are separated by 4 KHz so that they lie at frequencies of 1,244 KHz ... 1,720 KHz, whereby the single sideband spectrums derived at station 12 extend between 1,242 KHz and 1,722 KHz. In addition, large user station 12 includes FM modulator 31 for deriving a voice channel having a bandwidth of 10 KHz and a center frequency of 1,024 KHz.

The separate frequency multiplexed sources 10, 19 and 31 at large user stations 11 and 12 are respectively combined in single sideband transmitters 13 and 14. The frequency multiplexed spectrums generated by single sideband transmitters 13 and 14 are respectively fed to parabolic reflectors 15 and 16 via diplexers 17 and 18. Reflectors 15 and 16 have apertures with diameters at least equal to 40 feet, whereby stations 11 and 12 are considered as large user stations. As illustrated by FIGS. 2A and 2B, the energy derived from each of the antennas 15 and 16 has a common carrier frequency, $F_c$, on the order of 6 GHz, which is actually suppressed, and a number of single sideband AM channels, each having a total bandwidth of 4 KHz. From station 11, 106 single sideband phase modulated channels are derived, with 53 of the channels being located in the spectrum from $F_c$ + 758 KHz to $F_c$ + 970 KHz and the remaining 53 channels being in the spectrum between $F_c$ + 1,030 KHz to $F_c$ + 1,242 KHz. The 10 KHz FM channel has a center, subcarrier frequency of $F_c$ + 976 so that it extends from $F_c$ + 971 KHz to $F_c$ + 981 KHz. In the gap between $F_c$ + 981 KHz to $F_c$ + 1,030 KHz, a slot is provided in the energy transmitted from station 11.

While the spectrums transmitted from stations 11 and 12 have an identical suppressed carrier at $F_c$, the voice channels are in different spectral regions relative to the spectrum transmitted from station 11. In particular, the 10 KHz FM channel transmitted from station 12 has a subcarrier frequency at $F_c$ + 1,024 KHz so that the channel extends from $F_c$ + 1,019 KHz to $F_c$ + 1,029 KHz. 120 single sideband AM channels are frequency multiplexed at station 12 and are transmitted therefrom in the frequency band extending from $F_c$ + 1,242 to $F_c$ + 1,722 KHz.

A portion of the spectra derived by large user stations 11 and 12 are coupled via a communication link including relay equipment 71 on a synchronous ATS earth satellite to small user stations 21 and 22, which also communicate with another pair of small user stations 23 and 24 via the satellite. Each of small user stations 21—24 includes an antenna having a parabolic reflector 32 with a diameter not in excess of 20 feet, and generally in the range between 6 and 15 feet. Each of small user stations 21—24 includes a receiver 33 for detecting only one 10 KHz FM spectrum at a time. Because only one of the 10 KHz spectra is detected at each of the small user stations 21—24 at a time, receivers 33 have a relatively low threshold whereby they are capable of detecting voice modulations on the $F_c$ + 976 KHz and $F_c$ + 1,024 KHz subcarriers transmitted from large user stations 11 and 12, as well as 10 KHz FM voice channels that originate at the small user stations.

At each of small user stations 21—23 a different 10 KHz FM voice bandwidth channel is generated. To this end, at each of stations 21—23 there is provided a 10 KHz FM modulator 34 and an FM transmitter 35. Each of transmitters 35 derives a different carrier frequency respectively designated as: $F_c$ + 988 KHz, $F_c$ + 1,000 KHz and $F_c$ + 1,012 KHz. The 10 KHz FM voice spectra derived from transmitters 35 of small user stations 21—23 are fed through diplexers 36 at the small user stations to small user antennas which derive the spectra illustrated by FIGS. 2C—2E, respectively. Each 10 KHz FM voice channel running the spectral range between $F_c$ + 971 KHz and $F_c$ + 1,029 KHz includes a carrier and first order sidebands indicating the modulating information.

The spectra derived from large user stations 11 and 12, as well as those derived from small user stations 21—23, are transmitted to synchronous satellite 71, located at a relatively fixed point, approximately 23,000 miles above the surface of the earth. The satellite relay equipment 71 comprises parabolic reflector 72 which feeds the spectra derived from stations 11, 12 and 21—23 to 6 GHz receiver 73 via diplexer 74. Receiver 73 derives an intermediate frequency spectrum including each of the channels transmitted from the ground stations 11, 12 and 21—23. Because equal amplitude energy is received at 71 from the several ground stations the output of receiver 73 is a spectrum that appears to be derived from a single source.

The IF spectrum output of receiver 73 is converted to a phase modulated signal in modulator 75, having an output which feeds transmitter 76. Transmitter 76 derives a carrier having a frequency, $F_c'$, of approximately 4 GHz, as well as both the upper and lower sidebands of the energy output of phase modulator 75. The output of transmitter 76 is fed through diplexer 74 to antenna 72 from whence it is retransmitted to large user stations 11 and 12 and each of small user stations 21—24.

As indicated by FIG. 3, the spectrum transmitted from relay equipment 71 includes a carrier at frequency $F_c'$, as well as upper and lower sidebands displaced from the carrier by frequencies of ± 758 KHz to ± 1,722 KHz. In the region displaced from the carrier $F_c'$ by 758 to 970 KHz, 53 of the 4 KHz AM channels transmitted from large user station 11 subsist, while the remaining 53 AM channels transmitted from large user station 11 are in the frequency band displaced from $F_3'$ by ± 1,030 KHz to ± 1,242 KHz. In the spectrum displaced from $F_c'$ by ± 1,242 KHz to ± 1,722 KHz lie the 120 AM channels, each having a bandwidth of 4 KHz, transmitted from large user station 12. On both sides of $F_c'$ in the slots between the two 53 channel spectra originally derived from station 11, lie the five 10 KHz FM channels. The entire spectrum transmitted from relay equipment 71 results from a phase modulation process so that information in each of the five FM, 10 KHz channels lies in the two first order sidebands on either side of the $F_c'$ PM carrier.

To provide a more complete understanding of the modulation concept, consider the conversion of 10 KHz voice information FM modulated on the 976 KHz subcarrier at large user station 11. This information, when transmitted from satellite 71, is centered at subcarriers having frequencies removed from $F_c'$ by ± 976 KHz. The first order sideband of the subcarriers, in which there is sufficient information to enable the voice signal to be reconstructed, requires a spectrum extending ± 5 KHz from the subcarrier frequency.

Small user stations 21—24 have the 10 KHz receivers 33 thereof respectively tuned to the subcarrier frequencies of: $F_c'$ + 976 KHz, $F_c'$ + 1,024 KHz, $F_c'$ + 988 KHz, and $F_c'$ + 1,000 KHz. Each of the receivers 33 mixes its received subcarrier frequency with the modulation in the first order sideband to derive a 10 KHz bandwidth signal that is a replica of the spectrum modulated on the corresponding transmitted subcarrier. By utilizing receivers 33 at the small user stations 21—24 with bandwidths of only 10 KHz, low receiver thresholds are provided, enabling the relatively small aperture antenna dishes to be utilized.

The particular selection of the transmitter and receiver center frequencies for the large and small user stations enables 10 KHz FM channels to be established to the different small user stations via relay equipment 71 as follows: transmission from station 11 to station 21; transmission from station 21 to station 23; transmission from station 23 to station 24; and transmission from station 12 to station 22. In addition, each of large user stations 11 and 12 includes means for receiving the entire spectrum transmitted by the other large user station, as well as the spectra transmitted from small user stations 21—23.

To establish the large user receiver channels, each of large user stations 11 and 12 includes a PM receiver 20 responsive to radiation from relay equipment 71. Since the receivers at the two large user stations are identical, the detailed description for the one at station 11 only is given. The wideband spectrum illustrated by FIG. 3 is picked up by antenna 15 and fed through diplexer 17 to wideband RF amplifier 81, the output of which is heterodyned with the stabilized output frequency of local oscillator 82 in mixer 83. Mixer 83 derives a difference frequency output, having a center frequency of 70 MHz, which is fed through IF amplifier 84 to phase detector 95. The outputs of phase detector 95 are fed in parallel to five FM detectors 86, one for each of the FM spectra transmitted from stations 11, 12, 21—23. Each of the FM detectors is described infra in conjunction with the detailed description of the small user station. The other output of phase detector 95 is fed to 226 synchronous SSB-AM detectors 87, one being provided for each of the single sideband 4 KHz bandwidth channels derived from large user stations 11 and 12. Thereby, at large user station 11 there are derived signals indicative of the voice signals transmitted from large user stations 11 and 12, as well as small user stations 21—23, as relayed through the equipment on satellite 71.

Reference is now made to FIG. 4 of the drawings wherein there is illustrated a detailed block diagram of the apparatus at typical small user stations 21—23 including transmission and reception functions. Station 24, which includes only the receiver portion of a complete small user station, however, is modified appropriately. The FM modulators and detectors included at large user stations 11 and 12 are identical with the transmitters and receivers at the small user stations, with the exception of the single sideband transmitters and the front end of the receivers.

Considering the transmitter portion of a typical small user transceiver station 21, a voice spectrum is derived by microphone 101 and fed to preemphasis network 106. The signal derived from preemphasis network 106 is frequency shaped and amplitude limited in a well-known manner usually employed in FM transmitters. The output of preemphasis network 106 is fed to audio amplifier 107, having controlled gain, the output of which feeds frequency modulator 108, also responsive to a 1 MHz reference carrier, derived in a manner described infra. The output of modulator 108 is an FM spectrum having a 1 MHz center or carrier frequency which is fed to multiply by nine frequency multiplier 109, included to enable the modulation index to be increased. The output of frequency multiplier 109 is fed to crystal filter 111, having a center frequency of 9 MHz and a bandwidth of 10 KHz so that the voice information FM spectrum is limited to a total bandwidth of 10 KHz.

The output of filter 111 is translated to a frequency related to the subcarrier or center frequency transmitted from the particular small user station. For example, for small user stations 21—23, the output of filter 111 is translated to frequencies respectively commensurate with 988 KHz, 1,000 KHz and 1,012 KHz. To this end, the output of filter 111 is heterodyned in mixer 112 with a reference frequency having a value of 61 MHz + $F_{cs}$, where $F_{cs}$ is the frequency of the subcarrier transmitted from the particular small user station relative to $F_c$, the common carrier frequency for stations 11 and 12. The 61 MHz + $F_{cs}$ signal is derived by mixing the output of crystal local oscillator 113, having a frequency of 6 MHz + $F_{cs}$, with a 55 MHz reference frequency derived by the multiply by 11 frequency multiplier 114 in mixer 115. The sum frequency output derived by mixer 115 is fed through relatively broad band band-pass filter 116, having a center frequency of about 61 MHz. By utilizing the system described, the transmitters at each of the small user stations 21—23 are identical except with regard to the crystal in the local oscillator 113. Thereby, each of the stations 21—23 can selectively transmit information via the different FM channels merely by substitution of crystals in oscillator 113.

The sum frequency derived by mixer 112, having a nominal frequency of 70 MHz, is passed through band-pass filter 117 to one input of mixer 118, the other input of which is a reference frequency having a nominal frequency of 6 GHz. The 6 GHz input to mixer 118 is derived by up-frequency converting a 5 MHz reference (derived as described infra) fed to multiply by 5 frequency multiplier 119. The output of multiplier 119 which drives mixer 112 is also responsive to a reference frequency of 1.0093986 MHz derived by oscillator 122. The sum frequency derived by mixer 121 is fed through crystal filter 123, having a pass band between 23.5 and 24.5 MHz. The signal derived by crystal 123 is increased in frequency by a factor of 256 in frequency multiplier 124, which feeds a reference frequency on the order of 6 GHz to mixer 118.

The output of mixer 118, a spectrum having a center frequency of 6.301050 GHz + $F_{cs}$ and ± 5 KHz sidebands, containing the frequency modulated information derived from microphone 101, is passed through band-pass filter 125 to intermediate power amplifier 126, which drives cascaded filter 127, amplitude regulator 128 and power amplifier 129. The spectrum derived by power amplifier 129 has a power level on the order of 30 watts regardless of the signal level at microphone 101 because the 6 GHz carrier is always present in an FM modulation process. The FM spectrum is fed through diplexer 131 to antenna 132, having a relatively small aperture of 20 feet diameter or less.

The FM spectrum derived from antenna 132 is transmitted to relay equipment 71 of synchronous satellite, where it is converted to phase modulation on a carrier of approximately 4 GHz. As indicated supra, the 4 GHz spectrum is transmitted from satellite 71 so that the reflecting dish at each of the large and small user stations 11, 12 and 21—24 receives the energy retransmitted from the satellite. At the large user stations 11 and 12, the spectrum transmitted from satellite 71 is amplified and converted to a 70 MHz IF, as indicated supra.

At the small user stations 21—24, the spectrum transmitted from satellite 71 is picked up by antenna 132 and fed through diplexer 131 to preselector tuner 133. Tuner 133 has a center frequency equal to the carrier transmitted from satellite relay equipment 71, which in a typical instance is 4.119599 GHz, and adequate bandwidth to pass all of the information in both sidebands of the spectrum derived by the relay equipment. The output of tuner 133 is fed to parametric amplifier 134, having relatively narrow bandwidth and low noise temperature, on the order of 200° Kelvin, whereby the entire receiver has a noise temperature of approximately 300° Kelvin. The 4 GHz carrier and the sidebands thereof derived at the output of parametric amplifier 134 are converted to an IF having a center frequency of 70 MHz in mixer 135, driven by a reference frequency of 4.049599 GHz.

The reference frequency fed to mixer 135 is derived from a 5 MHz signal applied to frequency multiplier 136, having an output which is a 15 MHz reference signal. The 15 MHz reference signal derived by frequency multiplier 136 is up-frequency translated by mixer 137, also responsive to crystal oscillator 138, having a frequency of 0.6585586 MHz. The sum frequency derived by mixer 137 is passed through band-pass filter 139, having a pass band between 15.6 and 15.9 MHz to multiply by 256 frequency multiplier 141. The output of frequency multiplier 141 is applied as the reference frequency input to mixer 135, which derives the 70 MHz signal that is passed through amplifier 142.

The 70 MHz signal derived by amplifier 142 is mixed with a reference frequency of 70 MHz in mixer 143. As seen infra, the 70 MHz reference applied to mixer 143 is derived in response to the carrier $F_c'$ and is thereby coherent with the 70 MHz carrier derived at the output of IF amplifier 142. Hence, mixer 143 derives a baseband output including all of the information in the sidebands transmitted from satellite 71. The signal strength in each channel derived from mixer 143 is twice that normally derived and the noise level is reduced because of the homodyne process that folds the lower sideband of the received spectrum onto the upper sideband. The output of mixer 143 is passed through band-pass filter 144, having low and high frequency cutoffs capable of passing the entire spectrum between 758 KHz and 1,722 KHz, containing all of the information transmitted from satellite 71.

The baseband output of band-pass filter 144 is up-frequency converted in mixer 145 to a spectrum having a center frequency of 7 MHz + $F_{cs}'$, where $F_{cs}'$ is the frequency to which the small user station is tuned, i.e., for station 21, $F_{cs}'$ = 976 KHz. The reference frequency of 7 KHz + $F_{cs}'$ is derived from crystal local oscillator 146. The difference frequency output of mixer 145 is fed through band-pass filter 147, having a center frequency of 7 MHz and a bandwidth of 10 KHz. Thereby, the output of band-pass filter 147 includes only the subcarrier of the FM source to be detected, as well as the information in the sidebands of the FM signals associated with the subcarrier, as transmitted from satellite 71. By utilizing the particular receiver specified, any one of the FM sources can be separately detected at any of the small user stations 21—24 by merely changing the crystal for local oscillator 146 so that the resonant frequency of the crystal is displaced from 7 MHz by an amount commensurate with the subcarrier frequency of the source desired to be detected. The basic frequency of 7 MHz for oscillator 146 was chosen because it is outside the baseband spectrum and is not equal to the reference frequency in the voltage controlled oscillator phase locked loop, which is now to be described.

The 5 MHz signal utilized as a reference in both the transmitter and receiver portions of the FM sections of the large user stations 11 and 12 and in the small user stations 21—24 is derived from the carrier transmitted from satellite 71, thereby providing coherent detection in the receivers, as well as compensating for Doppler shift frequency characteristics introduced on the down-link by movement of satellite 71. The 5 MHz reference frequency is derived by voltage controlled oscillator 151, selectively controlled by either a phase locked loop or a manual adjustment. The manual control is derived from a DC voltage at potentiometer 152 that is selectively connected by an operator to the input terminal of voltage controlled oscillator 151 through switch 153.

With oscillator 151 controlled automatically by the phase locked loop, switch 153 is actuated so that the output of low pass filter 154, having a cutoff frequency of 10 Hz, is connected to the input of oscillator 151. Low pass loop filter 154 is responsive to the DC output of phase detector 155, which compares the phases of the signals derived by voltage controlled oscillator 151 and IF amplifier 142. To these ends, the output of oscillator 151 is doubled in frequency by frequency multiplier 156, having an output which drives one input of phase detector 155. The 10 MHz output of frequency multiplier 156 is increased in frequency by multiply by 6 frequency multiplier 157, which feeds mixer 158, also responsive to the output of IF amplifier 142. In response to the 70 MHz carrier derived by amplifier 142 and the 60 MHz reference voltage generated by frequency multiplier 157, the 10 MHz difference frequency spectrum generated by mixer 158 is passed through 10 MHz band-pass filter 159, having a bandwidth of ± 5 KHz. The 10 MHz signal thereby derived from band-pass filter 159 is compared with a phase of the output of frequency multiplier 156 in phase detector 155 which feeds low pass filter 154 as described supra.

For initial frequency tracking prior to lock-on, switch 153 is activated so that the input voltage to oscillator 151 is determined by the manual setting of potentiometer 152. Once the frequency of oscillator 151 has been adjusted to achieve lock-on, the operator adjusts switch 153 so that the output of low pass filter 154 is applied to the voltage controlled oscillator input. Thereby, the frequency and phase of voltage controlled oscillator 151 is synchronized with the carrier transmitted from satellite 71 and all segments of the transmitter and receiver are slaved to the carrier transmitted from the satellite. In particular, the output of oscillator 151 feeds, in the receiver section of the small user transceiver, mixers 135 and 143 via multiply by 3 and 7 frequency multipliers 136 and 161, respectively; in the transmitter mixers 115 and 121, as well as phase modulator 108, are responsive to the 5 MHz output of oscillator 151 as respectively coupled through frequency translators 114, 119 and 110.

Returning again to consideration of the apparatus for recovering the data imposed by frequency modulation on the subcarrier $F_{cs}'$, the output of band-pass filter 147 is fed to an FM detector including a phase locked loop. The FM detector includes AGC amplifier 171, tuned to the center frequency of filter 147 and having a band-pass capable of amplifying the entire spectrum derived thereby. The output of amplifier 171 is fed to PM detector 172 which drives 5 KHz cutoff low pass filter 173, that in turn feeds a DC voltage to voltage controlled oscillator 174, having a center frequency of 7 MHz. The 7 MHz output of voltage controlled oscillator 174 is compared with the phase of the carrier at the output of amplifier 171 in PM detector 172.

To provide AGC control for amplifier 171, the output of oscillator 174 is compared with the output of amplifier 171 in correlation detector 175. Correlation detector 175 is similar to phase detector 172, but derives a maximum output in response to an in-phase relationship between the inputs thereof, while phase detector 172 derives a zero output if the inputs thereof have identical phases.

The output of low pass filter 173, a baseband spectrum having characteristics similar to that derived by amplifier 107 in one of the FM modulators either of large user stations 11 and 12 or small user stations 21—23, is applied to audio amplifier 176. The output of audio amplifier 176 is fed to deemphasis network 177 which feeds speaker 178 through audio amplifier 179.

The specific apparatus illustrated by FIG. 4 is included in each of small user stations 21—23, while small user station 24 includes only the apparatus associated with the receiver. Large user stations 11 and 12 include the apparatus associated with the transmitter illustrated by FIG. 4. The receiver sections of large user stations 11 and 12 wherein the FM transmitted spectrums are detected do not include preselector tuner 133 and parametric amplifier 134. Instead, the output of coupler 85 is fed directly to mixer 135 but the remainder of the apparatus at the large user stations required for detecting the FM signal is identical with the remaining portion of the receiver illustrated in FIG. 4.

While there has been described and illustrated one specific embodiment of the invention, it will be clear that variations in the details of the embodiment specifically illustrated and described may be made without departing from the true spirit and scope of the invention as defined in the appended claims.

I claim:

1. In a communication method wherein a synchronous artificial earth satellite includes relay equipment for receiving a spectrum having a number of S.S.B. amplitude modulated frequency multiplexed channels and for frequency translating said channels in a like manner so that it transmits a carrier and side bands angle modulated by information in said channels, each of the channels having the same bandwidth, comprising the steps of transmitting to said relay equipment only a portion of the spectrum from a large user station so that a number of adjacent channels are excluded from a predetermined frequency band, transmitting to said relay equipment a subcarrier and angle modulated information indicating sidebands, said subcarrier and sidebands having a bandwidth greater than the bandwidth of one of the channels and a frequency range only in the predetermined frequency band, and detecting at a small user station only the subcarrier frequency and sidebands transmitted from the relay carrier station corresponding with the transmitted subcarrier and sidebands.

2. The method of claim 1 wherein each of said transmitted channels is S.S.B. modulated and the subcarrier is frequency modulated.

3. A communication method comprising the steps of: transmitting a spectrum including a number of frequency multiplexed S.S.B. amplitude modulated channels having the same bandwidth, transmitting a subcarrier and angle modulated sidebands in a frequency region proximate the spectrum but at a frequency range outside the frequency region of any of the channels, said subcarrier and sidebands occupying a greater bandwidth than any of said channels; in a synchronous artificial earth satellite relay equipment: receiving the transmitted channels, as well as said subcarrier and sidebands, frequency translating in a like manner the channels, subcarrier and sidebands, and transmitting the frequency translated channels, subcarrier and angle modulated sidebands as angle modulation on a carrier; at a small user station: receiving the carrier and the modulation imposed thereon, and detecting only the subcarrier and sidebands modulated on the carrier.

4. The method of claim 3 wherein said angle modulated sidebands are frequency modulated.

5. The method of claim 3 wherein the channels, subcarrier and sidebands are transmitted from the satellite equipment in both upper and lower sidebands relative to the carrier, and at the small user station adding the angle modulated sidebands in the upper and lower sidebands.

6. The method of claim 5 wherein the angle modulated sidebands are added by effectively folding the upper sideband on the lower sideband.

7. The method of claim 4 wherein the modulation of the carrier transmitted from the equipment is phase modulated with both sidebands being derived.

8. In a communication method wherein a synchronous artificial earth satellite includes equipment for receiving a spectrum including a number of S.S.B. modulated subcarriers, said subcarriers being modulated as multiple channels each having predetermined bandwidth, and for transmitting a carrier modulated by information in said channels; comprising the steps of transmitting and receiving via the relay a number of said subcarriers between large user sites in a manner to exclude the transmission of several adjacent ones of said subcarriers from any large user sites, at a first small user site angle modulating a subcarrier lying within the frequency range excluded from transmission at the large user sites, said small user angle modulation extending over a bandwidth greater than the bandwidth of one of said channels, but less than, the entire frequency range excluded from transmission at the larger sites, transmitting the angle modulated subcarrier derived from the first small user site via the relay to another small user site, and at the another small user site receiving only the subcarrier and angle modulation transmitted from the first small user site via the relay.

9. In a communication system wherein a synchronous artificial earth satellite includes relay equipment for receiving a spectrum having a multiplicity of single sideband frequency multiplexed channels and for frequency translating said channels in a like manner so that the relay station transmits a carrier and sidebands angle modulated by data in said channels, each of the channels having the same bandwidth, comprising means for transmitting to said relay equipment only a portion of the spectrum from a large user station so that a plurality of adjacent ones of the channels are excluded from a predetermined frequency band, means for transmitting to said relay equipment a subcarrier and angle modulated information carrying sidebands, said subcarrier and sidebands having a bandwidth greater than the bandwidth of one of the channels and a frequency range only in the predetermined frequency band, and means at a small user station for detecting only the subcarrier frequency and sidebands transmitted from the relay station corresponding with the transmitted subcarrier and sidebands.

10. The system of claim 9 wherein said spectrum transmitting means includes means for single sideband, amplitude modulating each of the channels, and means for frequency modulating the information on the subcarrier.

11. A communication system comprising means for transmitting a spectrum including a multiplicity of frequency multiplexed single sideband amplitude modulated channels having the same bandwidth, means for transmitting a subcarrier and angle modulated sidebands in a frequency region proximate the spectrum but at a frequency range outside the frequency region of any of the channels, said subcarrier and sidebands occupying a greater bandwidth than any of said channels, an artificial earth satellite relay equipment including: means for receiving the transmitted channels, as well as said subcarrier and sidebands, means for translating in a like manner the channels, subcarrier and sidebands, and means for transmitting the frequency translated channels, subcarrier and sidebands as angle modulation on a carrier; a small user station including: means for receiving the carrier and the modulation imposed thereon, and means for detecting only the subcarrier and sidebands modulated on the carrier.

12. The system of claim 11 wherein the satellite equipment includes means for transmitting the subcarrier and sidebands in both upper and lower sidebands, the small user station includes means for adding the angle modulated sidebands in the upper and lower sidebands.

13. The system of claim 12 wherein said means for adding includes a homokyne mixer network.

14. The system of claim 11 wherein the relay equipment includes means for phase modulating the carrier transmitted from the equipment so that both sidebands are derived.